(12) United States Patent
Nonaka et al.

(10) Patent No.: US 12,071,371 B2
(45) Date of Patent: Aug. 27, 2024

(54) GLASS PANEL UNIT, WORK IN PROGRESS OF GLASS PANEL UNIT, GLASS PANEL UNIT ASSEMBLY, AND METHOD FOR MANUFACTURING GLASS PANEL UNIT

(71) Applicant: Panasonic Intellectual Property Management Co., Ltd., Osaka (JP)

(72) Inventors: Masataka Nonaka, Osaka (JP); Eiichi Uriu, Osaka (JP); Kazuya Hasegawa, Osaka (JP); Tasuku Ishibashi, Ishikawa (JP); Hiroyuki Abe, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1001 days.

(21) Appl. No.: 17/044,480

(22) PCT Filed: Mar. 8, 2019

(86) PCT No.: PCT/JP2019/009229
§ 371 (c)(1),
(2) Date: Oct. 1, 2020

(87) PCT Pub. No.: WO2019/207971
PCT Pub. Date: Oct. 31, 2019

(65) Prior Publication Data
US 2021/0147291 A1 May 20, 2021

(30) Foreign Application Priority Data
Apr. 26, 2018 (JP) ................................ 2018-085838

(51) Int. Cl.
*C03C 27/06* (2006.01)
*E06B 3/66* (2006.01)
(Continued)

(52) U.S. Cl.
CPC ............ *C03C 27/06* (2013.01); *E06B 3/6612* (2013.01); *E06B 3/66304* (2013.01); *E06B 2003/66338* (2013.01); *E06B 3/6775* (2013.01)

(58) Field of Classification Search
None
See application file for complete search history.

(56) References Cited

U.S. PATENT DOCUMENTS

| 2005/0151475 A1 | 7/2005 | Sasaki et al. |
| 2015/0068665 A1 | 3/2015 | Abe et al. |
| (Continued) | | |

FOREIGN PATENT DOCUMENTS

| JP | 2003-115266 A | 4/2003 |
| JP | 2018-035043 A | 3/2018 |
| (Continued) | | |

OTHER PUBLICATIONS

Extended European Search Report issued in European Patent Application No. 19791552.3, dated May 19, 2021.
(Continued)

*Primary Examiner* — Lisa L Herring
(74) *Attorney, Agent, or Firm* — Rimon P.C.

(57) ABSTRACT

A glass panel unit includes: a pair of glass panels arranged to face each other; and a frame member disposed between the pair of glass panels to hermetically bond the pair of glass panels together. The frame member includes: a body; and a reinforcing portion. The body has a frame shape and includes: a first part containing a first sealing material having a first softening point; and a second part containing a second sealing material having a second softening point that is higher than the first softening point. The reinforcing portion contains a third sealing material having a third softening point that is higher than the first softening point.

(Continued)

The reinforcing portion is adjacent to the first part in a space surrounded with the pair of glass panels and the body.

2 Claims, 13 Drawing Sheets

(51) Int. Cl.
  *E06B 3/663* (2006.01)
  *E06B 3/677* (2006.01)

(56) References Cited

U.S. PATENT DOCUMENTS

| | | | |
|---|---|---|---|
| 2017/0210667 A1 | 7/2017 | Abe et al. | |
| 2017/0298681 A1* | 10/2017 | Abe | C03C 27/10 |
| 2018/0066470 A1* | 3/2018 | Dai | C03C 27/10 |
| 2018/0179806 A1 | 6/2018 | Abe et al. | |
| 2019/0077122 A1 | 3/2019 | Ishibashi et al. | |
| 2020/0010361 A1 | 1/2020 | Hasegawa et al. | |

FOREIGN PATENT DOCUMENTS

| | | |
|---|---|---|
| WO | 2013008724 A1 | 1/2013 |
| WO | 2013172034 A1 | 11/2013 |
| WO | 2016051787 A1 | 4/2016 |
| WO | 2017/121600 A1 | 7/2017 |
| WO | 2017/169677 A1 | 10/2017 |
| WO | 2018/062069 A1 | 4/2018 |

OTHER PUBLICATIONS

International Search Report and Written Opinion issued in corresponding International Application No. PCT/JP2019/009229, dated May 7, 2019, with partial English translation.

* cited by examiner

GLASS PANEL UNIT, WORK IN PROGRESS OF GLASS PANEL UNIT, GLASS PANEL UNIT ASSEMBLY, AND METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/009229, filed on Mar. 8, 2019, which in turn claims the benefit of Japanese Application No. 2018-085838, filed on Apr. 26, 2018, the entire disclosures of which Applications are incorporated by reference herein.

TECHNICAL FIELD

The present disclosure generally relates to a glass panel unit, a work in progress of a glass panel unit, a glass panel unit assembly, and a method for manufacturing the glass panel unit. More particularly, the present disclosure relates to a thermally insulating glass panel unit, a work in progress of a thermally insulating glass panel unit, an assembly of thermally insulating glass panel units, and a method for manufacturing the thermally insulating glass panel unit.

BACKGROUND ART

Patent Literature 1 discloses a multi-pane glazing unit (glass panel unit). According to Patent Literature 1, respective peripheral portions of a pair of glass panels arranged to face each other with a predetermined gap left between them are sealed with a sealant to form a hermetically sealable space between the glass panes and the space is then evacuated through an evacuation port, thereby creating a reduced pressure condition in the space. Subsequently, the space is partitioned by a region forming member arranged in the space to form partial regions with no evacuation ports. Thereafter, the partial regions are cut out of the pair of glass panels. In this manner, multi-pane glazing units with no evacuation ports or pipes are obtained.

According to Patent Literature 1, a glass frit, of which the melting temperature is higher than that of a frit seal as a sealant, may be used as boundary walls serving as the region forming member. In that case, however, when the region forming member is melted, the sealant may be melted more significantly than the region forming member and deformed. Such deformation of the molten sealant could break the hermetic seal of the space between the glass panes, which would in turn cause a decline in production yield.

CITATION LIST

Patent Literature

Patent Literature 1: WO 2013/172034 A1

SUMMARY OF INVENTION

The problem to overcome is to provide a glass panel unit, a work in progress of a glass panel unit, a glass panel unit assembly, and a method for manufacturing the glass panel unit, all of which are configured or designed to contribute to increasing the production yield.

A glass panel unit according to an aspect of the present disclosure includes: a pair of glass panels arranged to face each other; and a frame member disposed between the pair of glass panels to hermetically bond the pair of glass panels together. The frame member includes: a body; and a reinforcing portion. The body has a frame shape and includes: a first part containing a first sealing material having a first softening point; and a second part containing a second sealing material having a second softening point that is higher than the first softening point. The reinforcing portion contains a third sealing material having a third softening point that is higher than the first softening point. The reinforcing portion is adjacent to the first part in a space surrounded with the pair of glass panels and the body.

A work in progress of a glass panel unit according to another aspect of the present disclosure includes: a pair of glass substrates arranged to face each other; a peripheral wall; a boundary wall; and a reinforcing wall. The peripheral wall has a frame shape, contains a first sealing material having a first softening point and is disposed between the pair of glass substrates. The boundary wall contains a second sealing material having a second softening point that is higher than the first softening point and hermetically separates an internal space, surrounded with the pair of glass substrates and the peripheral wall, into a first space and a second space. The reinforcing wall contains a third sealing material having a third softening point that is higher than the first softening point. The reinforcing wall is adjacent to the peripheral wall in the internal space.

A glass panel unit assembly according to still another aspect of the present disclosure includes: a pair of glass substrates arranged to face each other; a peripheral wall; a partition; a reinforcing wall; an air passage; and an evacuation port. The peripheral wall has a frame shape, contains a first sealing material having a first softening point and is disposed between the pair of glass substrates. The partition contains a second sealing material having a second softening point that is higher than the first softening point and hermetically partitions an internal space, surrounded with the pair of glass substrates and the peripheral wall, into a first space and a second space. The reinforcing wall contains a third sealing material having a third softening point that is higher than the first softening point. The reinforcing wall is adjacent to the peripheral wall in the internal space. The air passage connects the first space and the second space together. The evacuation port connects the second space to an external environment.

A method for manufacturing a glass panel unit according to yet another aspect of the present disclosure includes an assembling step, an evacuation step, and a sealing step. The assembling step includes providing the glass panel unit assembly described above. The evacuation step includes evacuating the first space through the air passage, the second space, and the evacuation port. The sealing step includes heating the partition to a temperature equal to or higher than the second softening point to deform the partition and thereby close the air passage.

DESCRIPTION OF EMBODIMENTS

1. Embodiment

1.1. Overview

Figure 1:
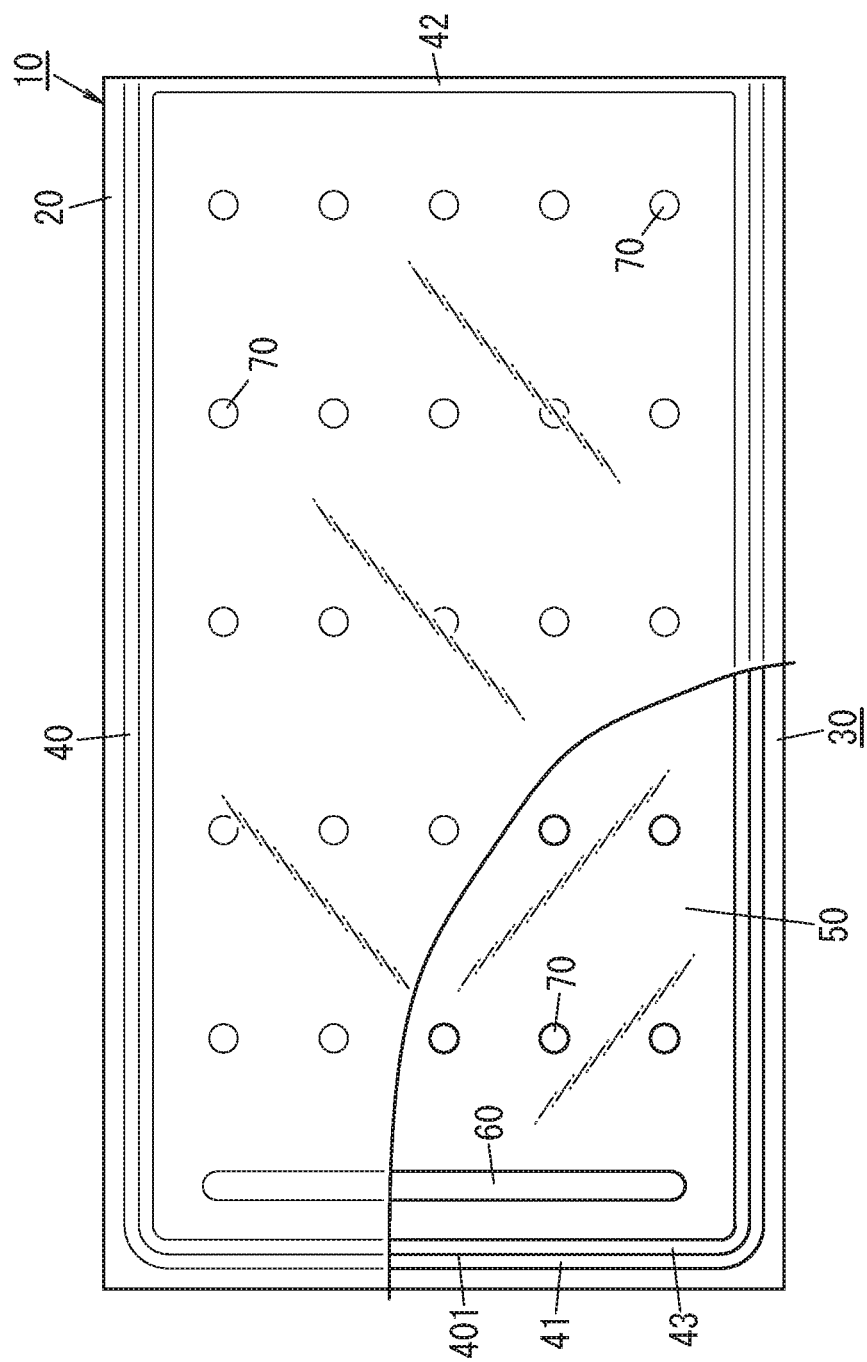
FIG. 1 is a schematic plan view of a glass panel unit according to an exemplary embodiment.
Figure 2:
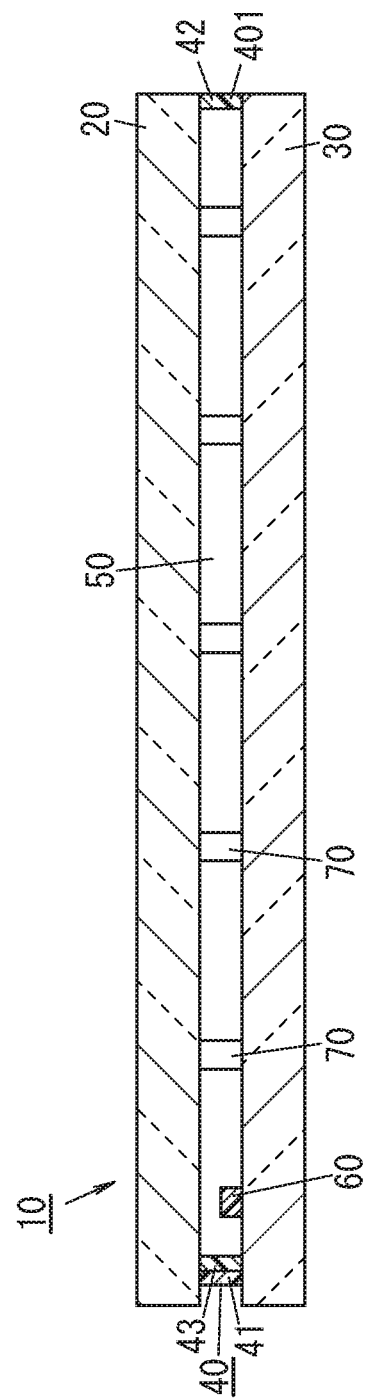
FIG. 2 is a schematic cross-sectional view of the glass panel unit according to the exemplary embodiment.

FIGS. 1 and 2 illustrate a glass panel unit (i.e., a glass panel unit as a final product) 10 according to an exemplary embodiment. The glass panel unit 10 includes: a pair of glass panels 20, 30 arranged to face each other; and a frame member 40 disposed between the pair of glass panels 20, 30 to hermetically bond the pair of glass panels 20, 30 together. The frame member 40 includes: a body 401; and a reinforcing portion 43. The body 401 has a frame shape. The body 401 includes: a first part 41 containing a first sealing material having a first softening point; and a second part 42 containing a second sealing material having a second softening point that is higher than the first softening point. The reinforcing portion 43 contains a third sealing material having a third softening point that is higher than the first softening point. The reinforcing portion 43 is adjacent to the first part 41 in a space (vacuum space) 50 surrounded with the pair of glass panels 20, 30 and the body 401.

In the glass panel unit 10, the reinforcing portion 43 having a higher softening point than the first part 41 is adjacent to the first part 41. This allows, even when the first part 41 is melted due to the heat during the manufacturing process of the glass panel unit 10, the reinforcing portion 43 to reduce the deformation of the first part 41. This reduces the chances of the deformation of the first part 41 of the body 401 of the frame member 40 breaking the hermetic seal of the space (vacuum space) 50 surrounded with the pair of glass panels 20, 30 and the body 401. This would contribute to increasing the production yield.

1.2. Configuration

Next, the glass panel unit 10 will be described in further detail. The glass panel unit 10 according to this embodiment is a so-called "vacuum insulated glazing unit." The vacuum insulated glazing unit is a type of multi-pane glazing unit (or multi-pane glass panel unit) including at least one pair of glass panels and has a vacuum space between the pair of glass panels.

The glass panel unit 10 includes a pair of glass panels (first and second glass panels) 20, 30, and a frame member 40 as shown in FIGS. 1 and 2. In addition, the glass panel unit 10 further includes a space (vacuum space) 50 surrounded with the pair of glass panels 20, 30 and the frame member 40. The glass panel unit 10 further includes, within the vacuum space 50, a gas adsorbent 60 and a plurality of pillars (spacers) 70.

The first and second glass panels 20, 30 have the same shape, and may be each formed in a rectangular flat plate shape. Examples of materials for the first and second glass panels 20, 30 include soda lime glass, high strain point glass, chemically tempered glass, alkali-free glass, quartz glass, Neoceram, and thermally tempered glass. The surface of the first and second glass panels 20, 30 may be covered with a coating. The coating may be a transparent infrared reflective film, for example. However, this is only an example and should not be construed as limiting. The coating does not have to be an infrared reflective film but may also be any other film with desired physical properties.

The frame member 40 includes a body 401 and a reinforcing portion 43. The body 401 has a frame shape and includes a first part 41 and a second part 42. The first part 41 has a U-shape. As shown in FIG. 1, the first part 41 is formed along three out of the four sides of the glass panel 30 and the second part 42 is formed along the other side of the glass panel 30. The reinforcing portion 43 is adjacent to the first part 41 in the space (vacuum space) 50 surrounded with the pair of glass panels 20, 30 and the body 401. In this embodiment, the reinforcing portion 43 also has a U-shape. As shown in FIG. 1, the reinforcing portion 43 is located in the space (vacuum space 50). In this embodiment, the reinforcing portion 43 is in contact with the entire surface, facing the space (vacuum space 50), of the first part 41 at least in a plan view. That is to say, in a plan view (i.e., when the glass panel unit 10 is viewed along the thickness thereof), the reinforcing portion 43 covers the entire surface, facing the space (vacuum space 50), of the first part 41.

The first part 41 contains a first sealing material (first hot glue) having a first softening point, and the second part 42 contains a second sealing material (second hot glue) having a second softening point that is higher than the first softening point. The reinforcing portion 43 contains a third sealing material (third hot glue) having a third softening point that is also higher than the first softening point. The first, second, and third hot glues are a glass frit, for example. The glass frit may be a low-melting glass frit, for example. Examples of the low-melting glass frits include a bismuth-based glass frit, a lead-based glass frit, and a vanadium-based glass frit. The first, second, and third hot glues do not have to be a glass frit but may also be a low-melting metal or a hot-melt adhesive, for example. In this embodiment, the same type of glue is used as the second and third glues. That is to say, the second and third sealing materials are made of the same material.

The gas adsorbent 60 is arranged in the vacuum space 50. Specifically, the gas adsorbent 60 has an elongate flat-plate shape and is arranged on the glass panel 30. The gas adsorbent 60 is used to adsorb an unnecessary gas (such as a residual gas). The unnecessary gas is a gas emitted from the hot glues (namely, the first, second, and third hot glues) forming the frame member 40 when the hot glues are heated, for example. The gas adsorbent 60 includes a getter. The getter is a material having the property of adsorbing molecules smaller in size than a predetermined one. The getter may be an evaporative getter, for example. The evaporative getter has the property of releasing adsorbed molecules when heated to a predetermined temperature (activation temperature) or more. This allows, even if the adsorption ability of the evaporative getter deteriorates, the evaporative getter to recover its adsorption ability by being heated to the activation temperature or more. The evaporative getter may be a zeolite or an ion-exchanged zeolite (such as a copper ion exchanged zeolite). The gas adsorbent 60 includes a powder of this getter. Specifically, the gas adsorbent 60 may be formed by applying a liquid including a powder of the getter (such as a dispersion liquid obtained by dispersing a powder of the getter in a liquid or a solution obtained by dissolving a powder of the getter in a liquid) and solidifying the liquid. This reduces the size of the gas adsorbent 60, thus allowing the gas adsorbent 60 to be arranged even when the vacuum space 50 is narrow.

The plurality of pillars 70 are arranged in the vacuum space 50. The plurality of pillars 70 is used to maintain a predetermined gap between the pair of glass panels 20, 30. That is to say, the plurality of pillars 70 is used to maintain the gap distance between the pair of glass panels 20, 30 at a predetermined value. Note that the dimensions, number, spacing, and arrangement pattern of the pillars 70 may be selected appropriately. Each of the pillars 70 has the shape of a circular column, of which the height is approximately equal to the predetermined gap. For example, the pillars 70 may have a diameter of 1 mm and a height of 100 μm. Optionally, the pillars 70 may also have any other desired shape such as a prismatic or spherical shape.

1.3. Manufacturing Method

Next, a method for manufacturing the glass panel unit 10 will be described with reference to FIGS. 3-12. This method for manufacturing the glass panel unit 10 includes preparatory steps and a removing step.

Figure 3:
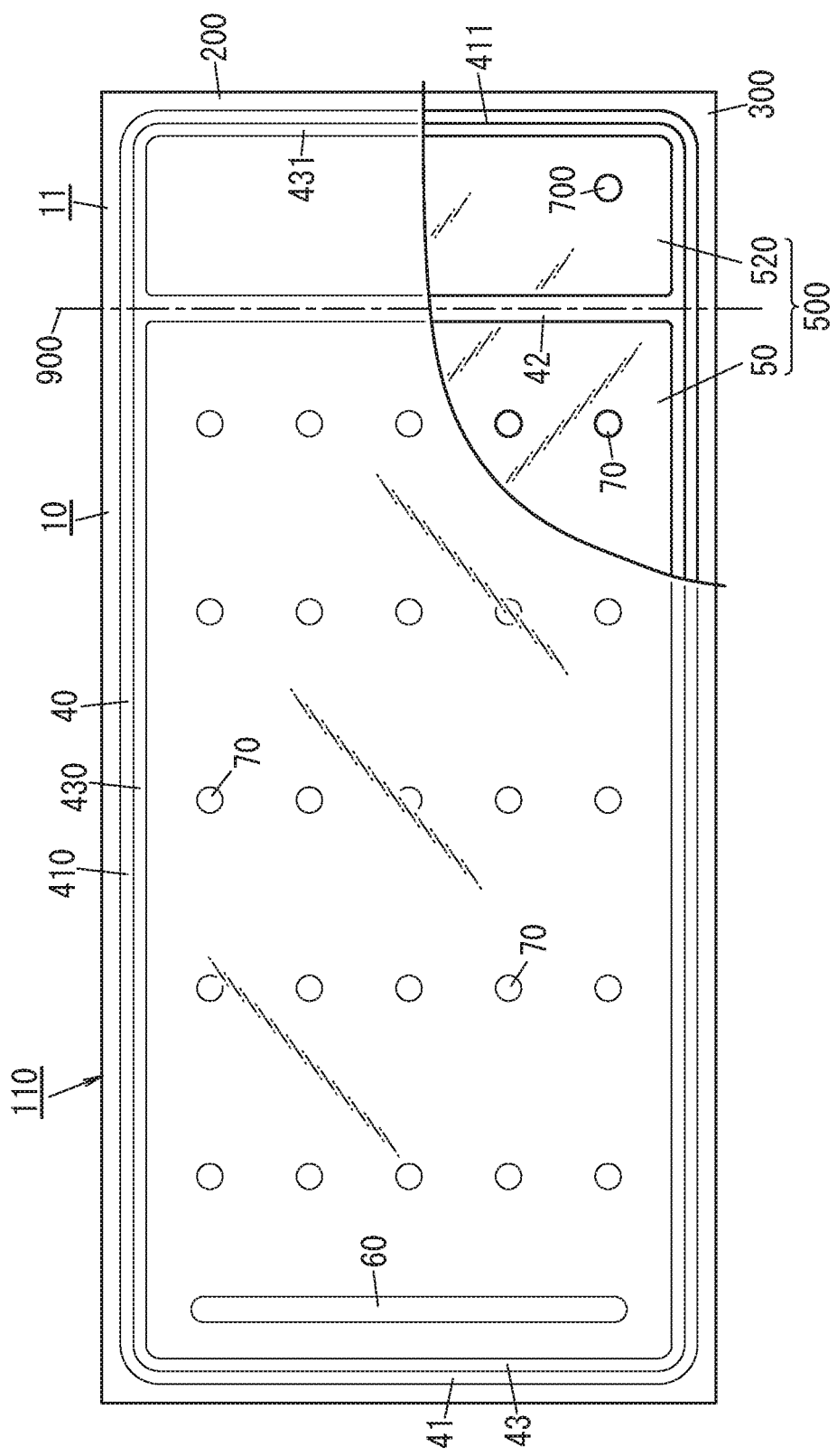
FIG. 3 is a schematic plan view of a work in progress of the glass panel unit according to the exemplary embodiment.

The preparatory steps are the steps of providing the work in progress 110 of a glass panel unit shown in FIG. 3. The work in progress 110 is formed out of the glass panel unit assembly 100 shown in FIGS. 4 and 5.

Figure 9:
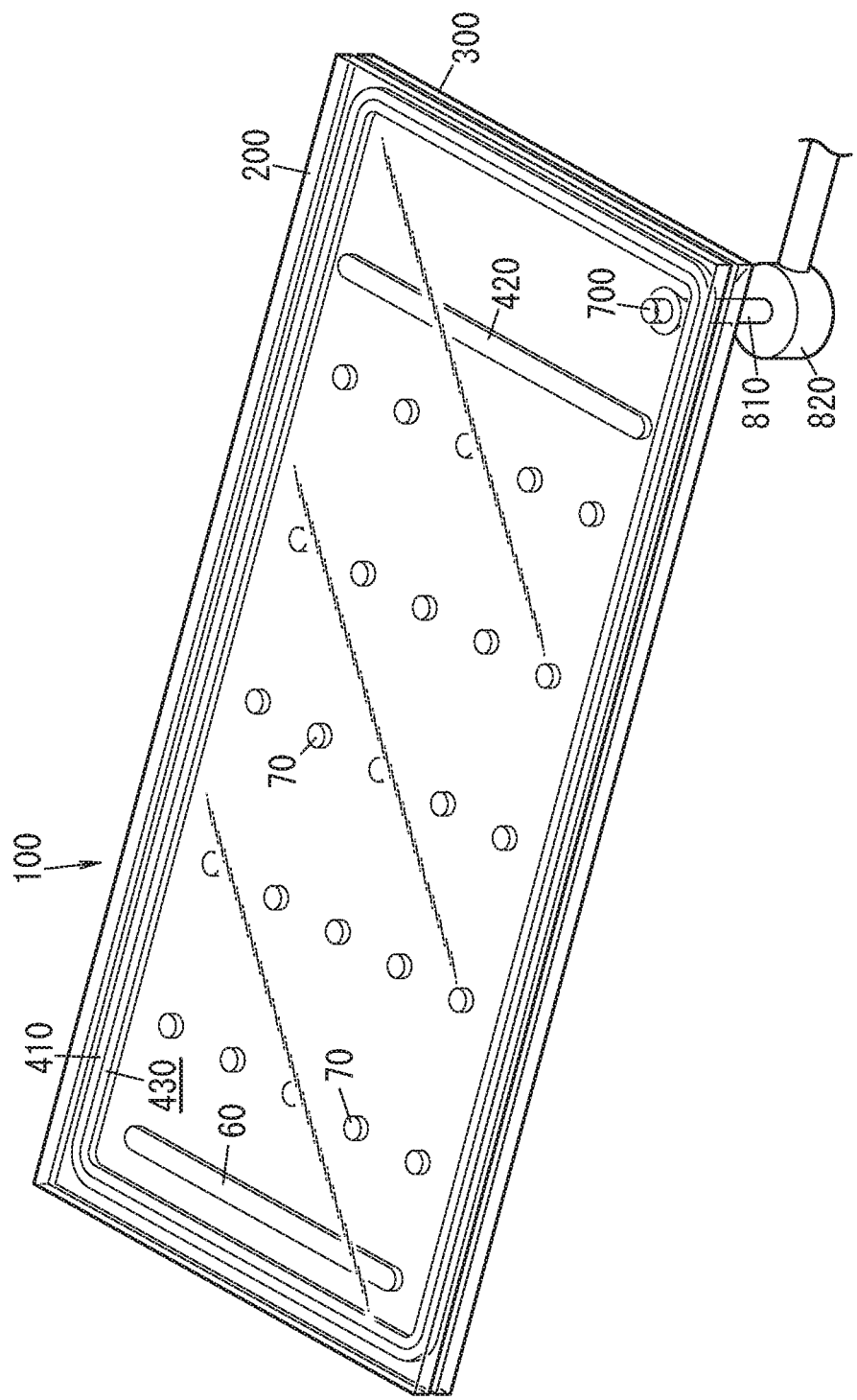
FIG. 9 illustrates yet another step of the method for manufacturing the glass panel unit according to the exemplary embodiment.
Figure 10:
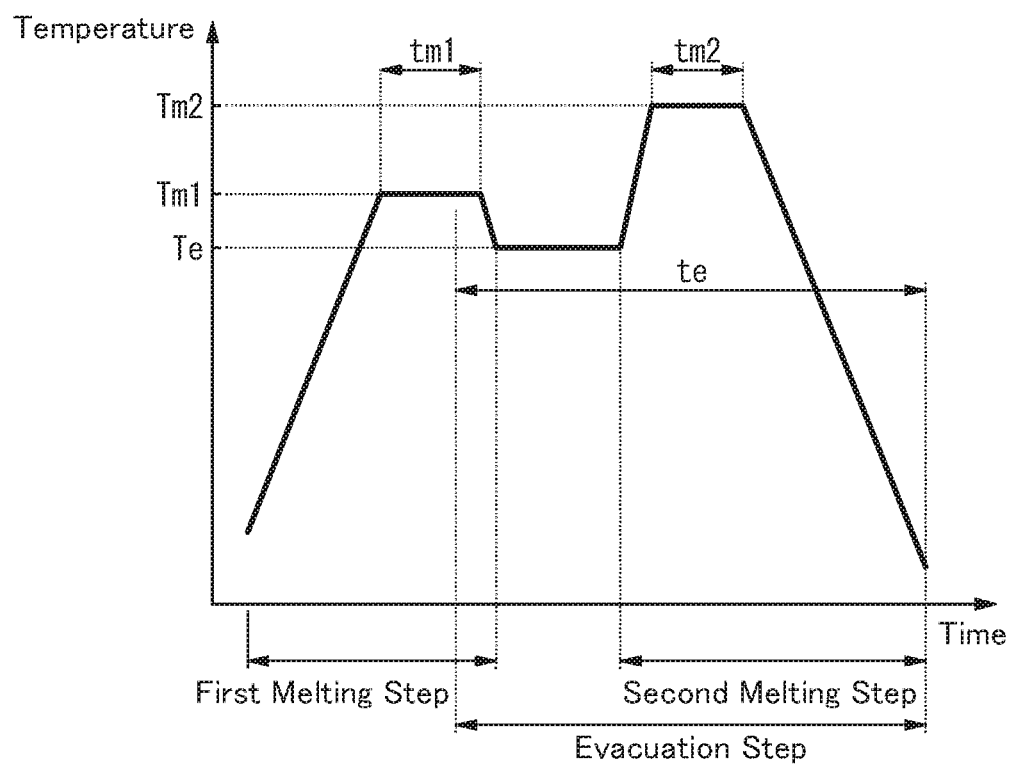
FIG. 10 illustrates yet another step of the method for manufacturing the glass panel unit according to the exemplary embodiment.

The preparatory steps include an assembling step (see FIGS. 6-9), a first melting step (see FIG. 10), an evacuation step (see FIG. 10), and a second melting step (see FIG. 10).

Figure 4:
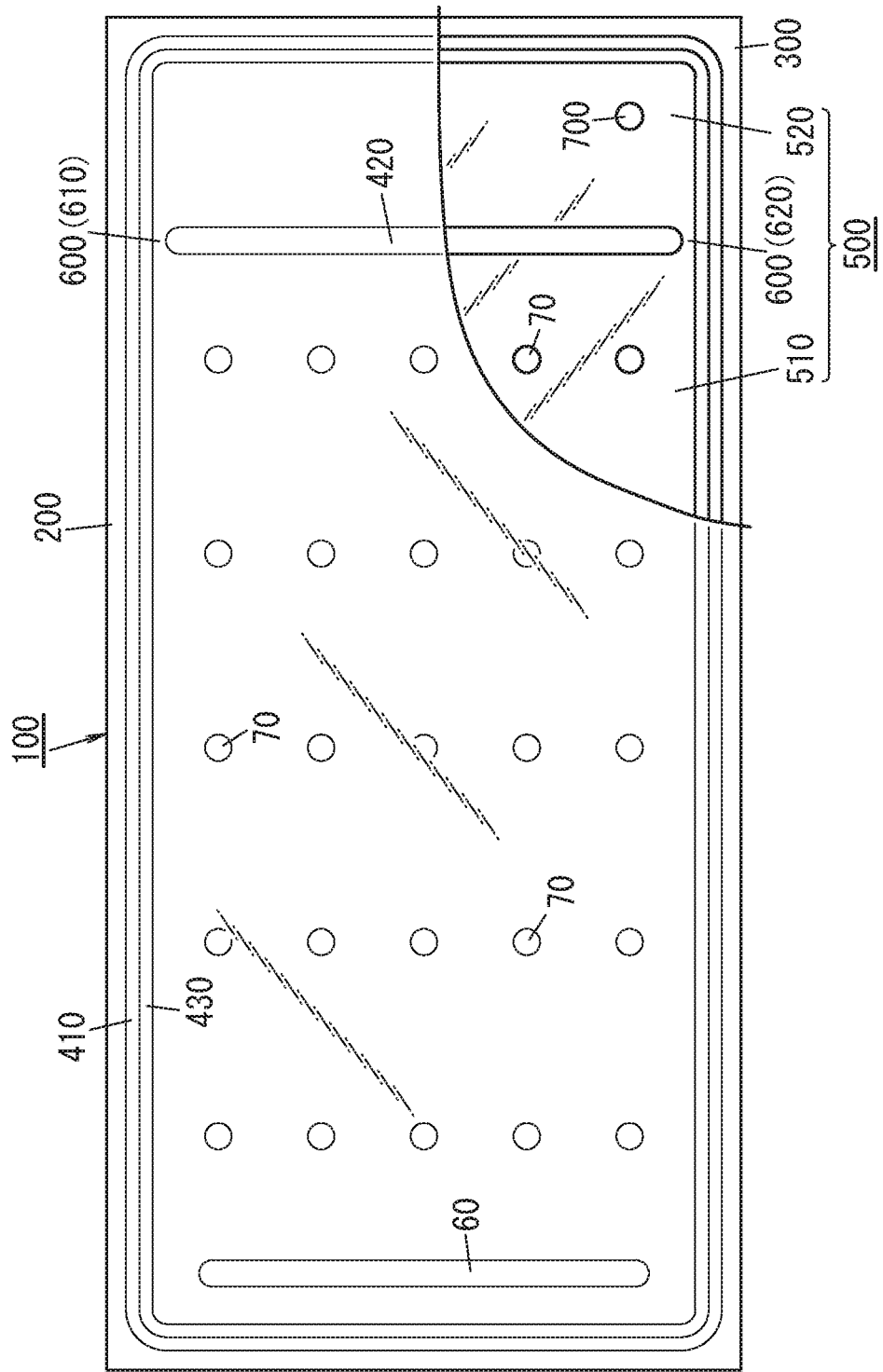
FIG. 4 is a schematic plan view of a glass panel unit assembly according to the exemplary embodiment.
Figure 5:
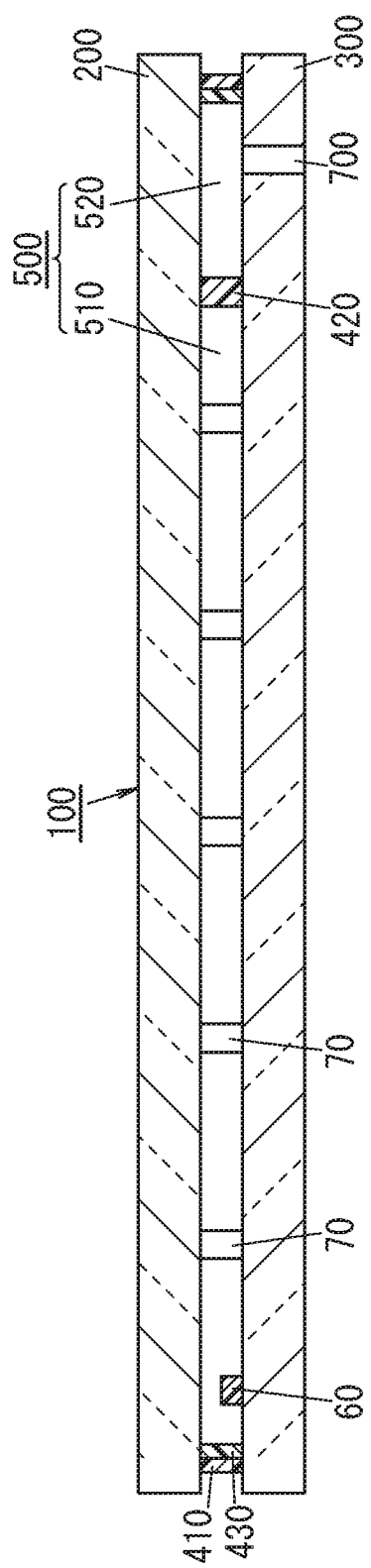
FIG. 5 is a schematic cross-sectional view of the glass panel unit assembly according to the exemplary embodiment.

The assembling step is the step of providing the assembly 100. As shown in FIGS. 4 and 5, the assembly 100 includes a pair of glass substrates (first and second glass substrates) 200, 300, a peripheral wall 410, a partition 420, and a reinforcing wall 430. The assembly 100 further has an internal space 500 surrounded with the pair of glass substrates 200, 300 and the peripheral wall 410. The assembly 100 further includes a gas adsorbent 60 and a plurality of pillars (spacers) 70 in the internal space 500. The assembly 100 further has an evacuation port 700.

The first glass substrate 200 is a member that forms the basis of the first glass panel 20 and is made of the same material as the first glass panel 20. The second glass substrate 300 is a member that forms the basis of the second glass panel 30 and is made of the same material as the second glass panel 30. The first and second glass substrates 200, 300 have the same shape and each have a polygonal plate shape (e.g., a rectangular plate shape in this embodiment). In this embodiment, the first glass substrate 200 has dimensions that are large enough to form a single first glass panel 20, and the second glass substrate 300 has dimensions that are large enough to form a single second glass panel 30.

The peripheral wall 410 contains a first sealing material (i.e., a first hot glue). The peripheral wall 410 is disposed between the first glass substrate 200 and the second glass substrate 300. The peripheral wall 410 has a frame shape as shown in FIG. 4. Particularly, the peripheral wall 410 has a rectangular frame shape. The peripheral wall 410 is formed along the outer peripheries of the first and second glass substrates 200, 300. The peripheral wall 410 hermetically bonds the first glass substrate 200 and the second glass substrate 300 together. Thus, in the assembly 100, an internal space 500 is created to be surrounded with the peripheral wall 410, the first glass substrate 200, and the second glass substrate 300.

The partition 420 contains a second sealing material (second hot glue). The partition 420 is arranged in the internal space 500. The partition 420 partitions the internal space 500 into a first space (evacuation space) 510 and a second space (ventilation space) 520. The first space 510 is a space to be evacuated later. The second space 520 is a space for use to evacuate the first space 510. The partition 420 is provided closer to a first end (i.e., the right end in FIG. 4) along the length (i.e., the rightward/leftward direction in FIG. 4) of the second glass substrate 300 than to the center of the second glass substrate 300 such that the first space 510 has a larger area than the second space 520. The partition 420 is a linear member arranged along the width (i.e., the upward/downward direction in FIG. 4) of the second glass substrate 300. Nevertheless, neither longitudinal end of the partition 420 is in contact with the peripheral wall 410.

The reinforcing wall 430 contains a third sealing material (third hot glue). The reinforcing wall 430 has a frame shape as shown in FIG. 4. Particularly, the reinforcing wall 430 has a rectangular frame shape. Also, the reinforcing wall 430 is adjacent to the peripheral wall 410 in the internal space 500. In this embodiment, the reinforcing wall 430 is located inside the peripheral wall 410 such that the outer side surfaces of the reinforcing wall 430 are in tight contact with the inner side surfaces of the peripheral wall 410. Thus, the reinforcing wall 430 covers the entire inner side surface of the peripheral wall 410 at least in a plan view. In addition, the reinforcing wall 430 is out of contact with the partition 420.

The air passages 600 connect the first space 510 and the second space 520 together in the internal space 500 as shown in FIG. 4. The air passages 600 include a first air passage 610 and a second air passage 620. The first air passage 610 is a gap between a first end (i.e., the upper end in FIG. 4) of the partition 420 and the reinforcing wall 430. The second air passage 620 is a gap between a second end (i.e., the lower end in FIG. 4) of the partition 420 and the reinforcing wall 430.

The evacuation port 700 connects the second space 520 to the external environment. The evacuation port 700 is used to evacuate the first space 510 through the second space 520 and the air passages 600 (namely, the first air passage 610 and the second air passage 620). Thus, the air passages 600, the second space 520, and the evacuation port 700 together form an evacuation path for evacuating the first space 510. The evacuation port 700 is cut through the second glass substrate 300 to connect the second space 520 to the external environment. Specifically, the evacuation port 700 is provided at a corner of the second glass substrate 300.

The gas adsorbent 60 and the plurality of pillars 70 are arranged in the first space 510. In particular, the gas adsorbent 60 is formed along the width of the second glass substrate 300 so as to be located close to a second end along the length (i.e., the left end in FIG. 4) of the second glass substrate 300. That is to say, the gas adsorbent 60 is arranged at an end of the first space (vacuum space 50). This makes the gas adsorbent 60 less noticeable. In addition, the gas adsorbent 60 is located distant from the partition 420 and the air passage 600. This reduces the chances of the gas adsorbent 60 interfering with evacuation of the first space 510.

The assembling step is the step of forming the first glass substrate 200, the second glass substrate 300, the peripheral wall 410, the partition 420, the reinforcing wall 430, the internal space 500, the air passages 600, the evacuation port 700, the gas adsorbent 60, and the plurality of pillars 70 to obtain the assembly 100. The assembling step includes first to sixth steps. Optionally, the order in which the second to fifth steps are performed may be changed as appropriate.

The first step is the step of forming the first glass substrate 200 and the second glass substrate 300 (i.e., a substrate forming step). For example, the first step includes making the first glass substrate 200 and the second glass substrate 300. If necessary, the first step may further include cleaning the first glass substrate 200 and the second glass substrate 300.

Figure 6:
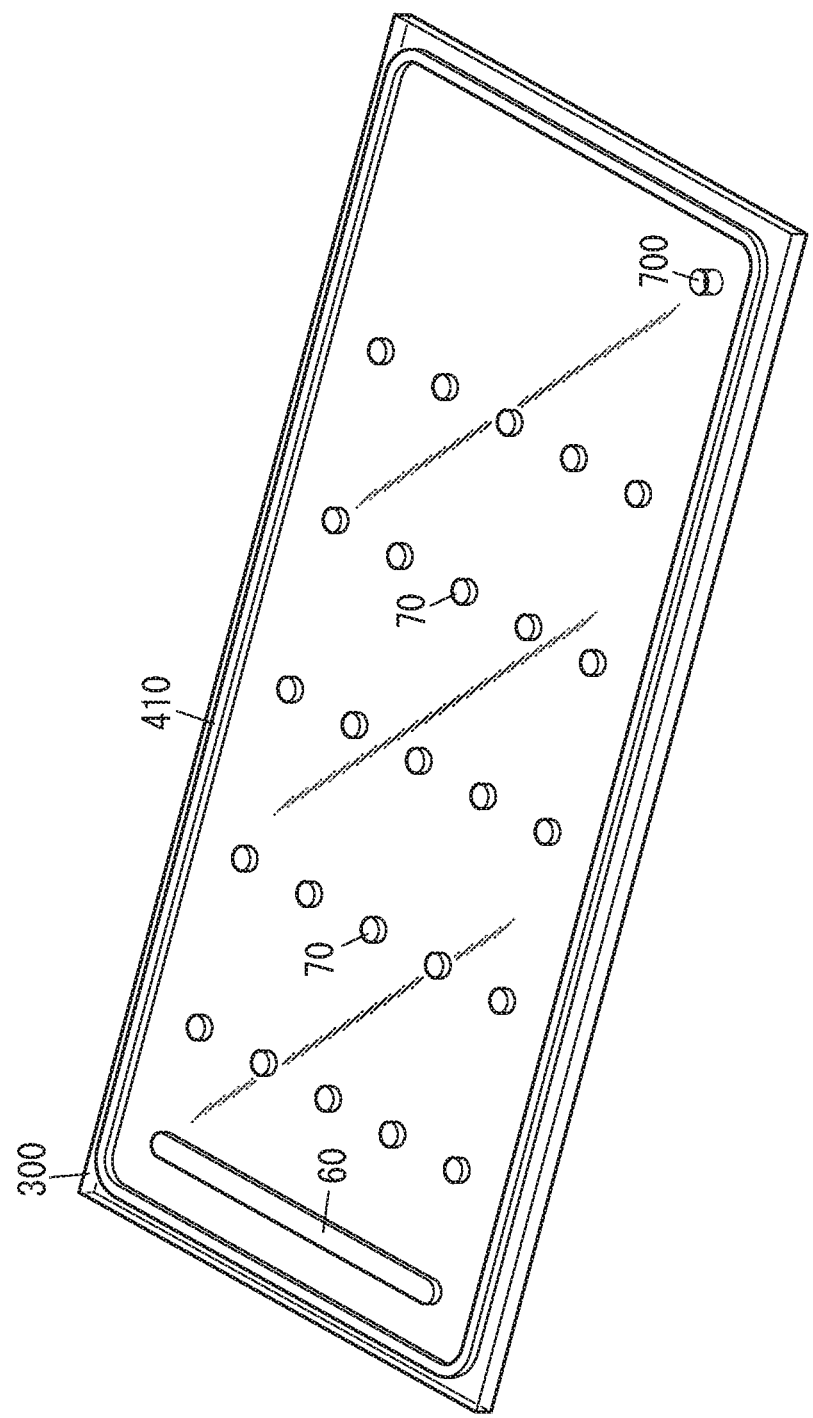
FIG. 6 illustrates a step of a method for manufacturing the glass panel unit according to the exemplary embodiment.

The second step is the step of forming the evacuation port 700. The second step includes cutting the evacuation port 700 through the second glass substrate 300 as shown in FIG. 6. If necessary, the second step includes cleaning the second glass substrate 300.

The third step is the step of forming spacers 70 (spacer forming step). The third step includes forming a plurality of spacers 70 in advance and placing, using a chip mounter or any other tool, the plurality of spacers 70 at predetermined positions on the second glass substrate 300. Alternatively, the plurality of spacers 70 may also be formed by a combination of photolithography and etching techniques. In that case, the plurality of spacers 70 may be made of a photo-curable material, for example. Still alternatively, the plurality of spacers 70 may also be formed by a known thin film forming technique.

The fourth step is the step of forming the gas adsorbent 60 (gas adsorbent forming step). The fourth step includes forming the gas adsorbent 60 by applying, using a dispenser, for example, a liquid in which a powder of a getter is dispersed onto predetermined positions on the second glass substrate 300 and then drying the liquid.

The fifth step is the step of arranging the peripheral wall 410, the partition 420, and the reinforcing wall 430 (sealing material arrangement step). The fifth step includes forming the peripheral wall 410 by applying, using a dispenser, for example, a first sealing material onto the second glass substrate 300 and then drying the first sealing material (see FIG. 6). The fifth step also includes forming the partition 420 by applying, using a dispenser, for example, a second sealing material onto the second glass substrate 300 and then drying the second sealing material (see FIG. 7). The fifth step further includes forming the reinforcing wall 430 by applying, using a dispenser, for example, a third sealing material onto the second glass substrate 300 and then drying the third sealing material (see FIG. 7). Optionally, the fifth step may include pre-baking the first to third sealing materials while drying them. For example, the second glass substrate 300 onto which the first to third sealing materials have been applied is heated at 480° C. for 20 minutes. In this case, the first glass substrate 200 may also be heated along with the second glass substrate 300. That is to say, the first glass substrate 200 and the second glass substrate 300 may be heated under the same condition (e.g., at 480° C. for 20 minutes). This reduces the difference in the degree of warpage between the first glass substrate 200 and the second glass substrate 300.

Figure 7:
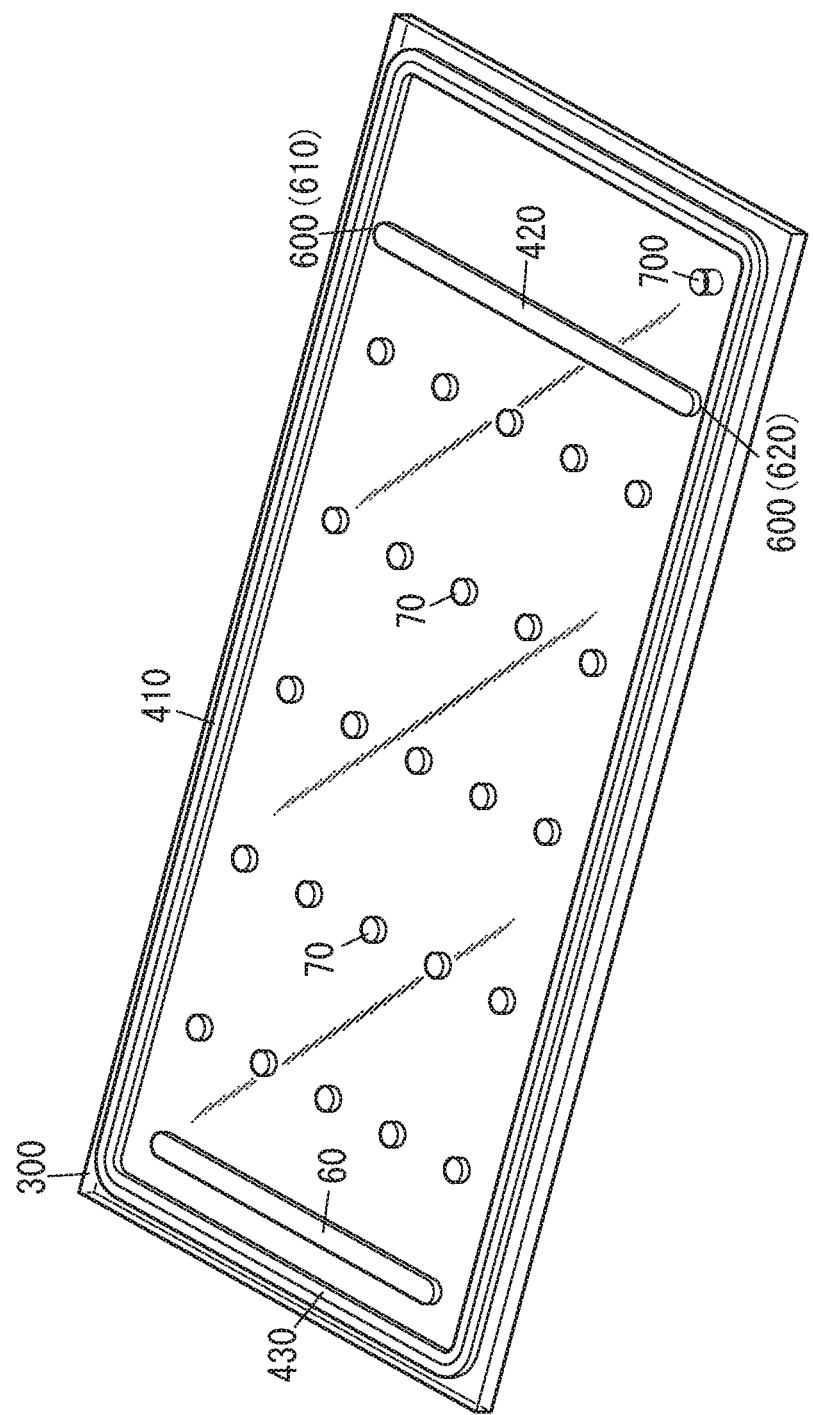
FIG. 7 illustrates another step of the method for manufacturing the glass panel unit according to the exemplary embodiment.

By performing these first to fifth steps, the second glass substrate 300 such as the one shown in FIG. 7 is obtained. On this second glass substrate 300, the peripheral wall 410, the partition 420, the reinforcing wall 430, the air passages 600, the evacuation port 700, the gas adsorbent 60, and the plurality of pillars 70 have been formed.

Figure 8:
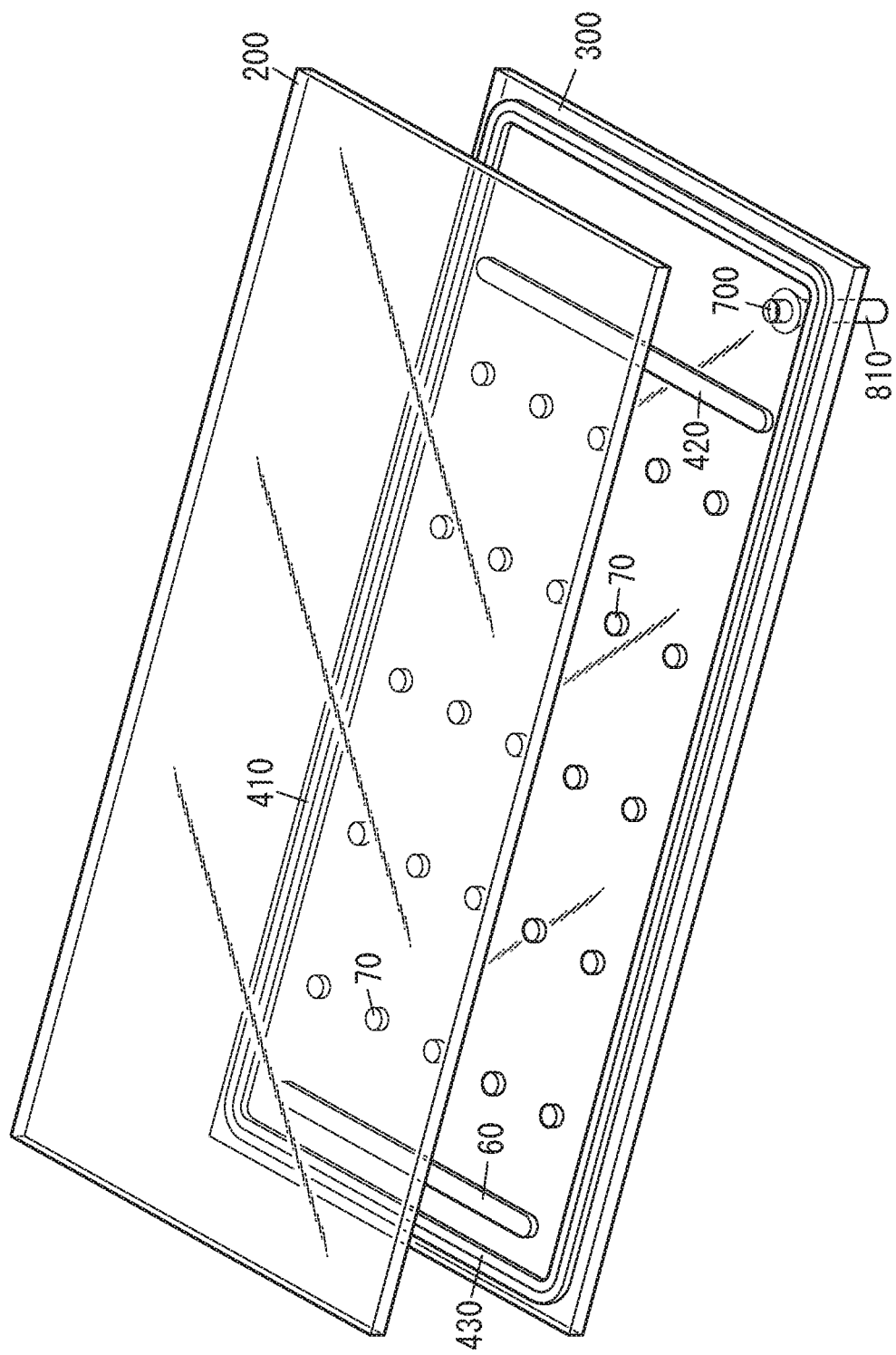
FIG. 8 illustrates still another step of the method for manufacturing the glass panel unit according to the exemplary embodiment.

The sixth step is the step of arranging the first glass substrate 200 and the second glass substrate 300 (arrangement step). In the sixth step, the first glass substrate 200 and the second glass substrate 300 are arranged to be parallel to each other and face each other as shown in FIG. 8.

The assembly 100 shown in FIG. 9 is obtained by performing this assembling step. After the assembling step has been performed, the first melting step (bonding step), the evacuation step, and the second melting step (sealing step) are carried out as shown in FIG. 10.

The first melting step is the step of melting the peripheral wall 410 once to hermetically bond the pair of glass substrates 200, 300 together with the peripheral wall 410. That is to say, this is a bonding step of heating and melting the peripheral wall 410 once at a melting temperature (first melting temperature Tm1) to hermetically bond the first and second glass substrates 200, 300 together with the peripheral wall 410. Specifically, the first glass substrate 200 and the second glass substrate 300 are loaded into a melting furnace and heated at the first melting temperature Tm1 for a predetermined amount of time (first melting time) tm1 (see FIG. 10). The first melting temperature Tm1 is set at a temperature equal to or higher than the first softening point of the first sealing material and lower than the second softening point of the second sealing material and the third softening point of the third softening point. This prevents the partition 420 from being deformed to close the air passages 600. For example, if the first softening point is 434° C. and the second softening point is 454° C., the first melting temperature Tm1 may be set at 440° C. The first melting time tm1 may be 10 minutes, for example.

In this case, the first melting temperature Tm1 is suitably closer to the second or third softening point than to the first softening point. This allows the peripheral wall 410 to be further softened while reducing the deformation of the partition 420 and the reinforcing wall 430. This facilitates, even when the pair of glass substrates 200, 300 has warpage, hermetically bonding the pair of glass substrates 200, 300 together with the peripheral wall 410.

The evacuation step is the step of evacuating the first space 510 through the air passages 600, the second space 520, and the evacuation port 700 to turn the first space 510 into a vacuum space 50. The evacuation may be carried out using a vacuum pump, for example. The vacuum pump may be connected to the assembly 100 via an evacuation pipe 810 and a sealing head 820 as shown in FIG. 9. The evacuation pipe 810 may be bonded to the second glass substrate 300 such that the inside of the evacuation pipe 810 and the evacuation port 700 communicate with each other, for example. Then, the sealing head 820 is attached to the evacuation pipe 810, thereby connecting a suction port of the vacuum pump to the evacuation port 700. The first melting step, the evacuation step, and the second melting step are performed with the assembly 100 kept loaded in the melting furnace. Therefore, the evacuation pipe 810 is bonded to the second glass substrate 300 at least before the first melting step.

The evacuation step includes evacuating the first space 510 through the air passages 600, the second space 520, and the evacuation port 700 at a temperature equal to or higher than an evacuation temperature Te for a predetermined amount of time (evacuation time) te or more before the second melting step is started (see FIG. 10). The evacuation temperature Te is set at a temperature higher than the activation temperature (e.g., 350° C.) of the getter of the gas adsorbent 60 but lower than the second softening point (e.g., 454° C.) of the second sealing material. The evacuation temperature Te may be 390° C., for example. This prevents the partition 420 from being deformed. In addition, this causes the getter of the gas adsorbent 60 to be activated and also causes the molecules (of the gas) adsorbed onto the getter to be released from the getter. Then, the molecules (i.e., the gas) released from the getter are exhausted through the first space 510, the air passages 600, the second space 520, and the evacuation port 700. Thus, this evacuation step allows the gas adsorbent 60 to recover its adsorption ability. The evacuation time te is set to create a vacuum space 50 with a predetermined degree of vacuum (e.g., a degree of vacuum of 0.1 Pa or less). The evacuation time te may be set at 120 minutes, for example.

Figure 11:
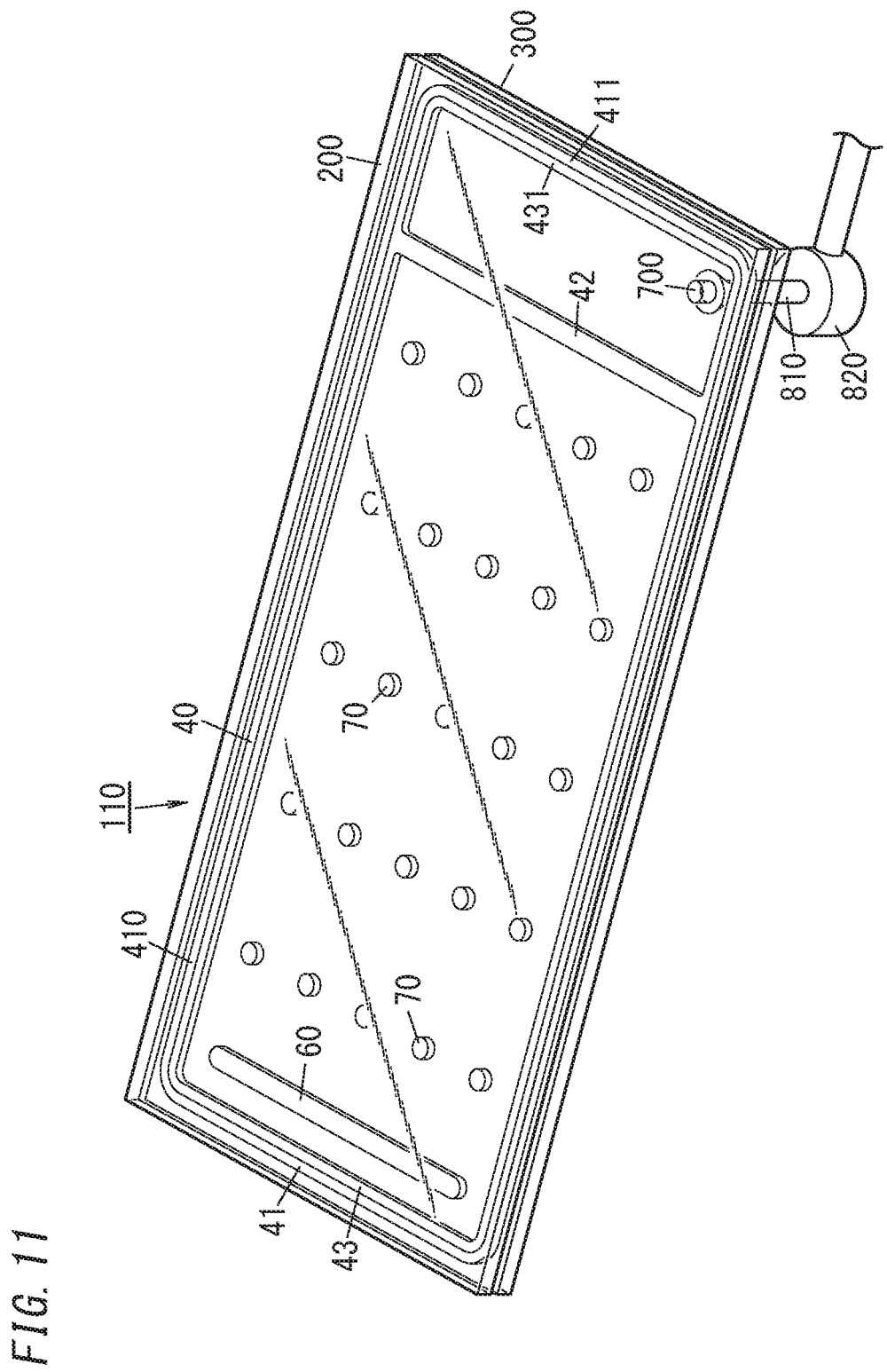
FIG. 11 illustrates yet another step of the method for manufacturing the glass panel unit according to the exemplary embodiment.

The second melting step is the step of closing the air passages 600 by deforming the partition 420 to form the second part (boundary wall) 42 and thereby obtain the work in progress 110. That is to say, the second melting step includes closing the air passages 600 by deforming the partition 420 to form a frame member 40 surrounding the vacuum space 50 (see FIG. 11). In this embodiment, the partition 420 is deformed such that both longitudinal ends of the partition 420 come into contact with, and are integrated with, the reinforcing wall 430. As a result, as shown in FIGS. 3 and 11, a boundary wall 42 is formed which hermetically separates the internal space 500 into the first space 510 (vacuum space 50) and the second space 520. More specifically, melting the partition 420 once at a predetermined temperature (second melting temperature) Tm2 equal to or higher than the second softening point of the second sealing material causes the partition 420 to be deformed. Specifically, the first glass substrate 200 and the second glass substrate 300 are heated in the melting furnace at a second melting temperature Tm2 for a predetermined amount of time (second melting time) tm2 (see FIG. 10). The second melting temperature Tm2 and the second melting time tm2 are set such that the partition 420 is softened to close the air passages 600. The lower limit of the second melting temperature Tm2 is the second softening point (e.g., 454° C.). The second melting temperature Tm2 may be set at 460° C., for example. Also, the second melting time tm2 may be 30 minutes, for example.

In this embodiment, the evacuation step is started halfway through the first melting step and ends when the second melting step ends as shown in FIG. 10. Thus, even during the first melting step, the first space 510 is also evacuated through the air passages 600, the second space 520, and the evacuation port 700. This creates a pressure difference between the inside and outside of the assembly 100. This pressure difference causes the pair of glass substrates 200, 300 to approach each other. This facilitates, even when the pair of glass substrates 200, 300 has warpage, hermetically bonding the pair of glass substrates 200, 300 together with the peripheral wall 410. Furthermore, since the evacuation step is still carried on during the second evacuation step, the first space 510 continues to be evacuated through the air passages 600, the second space 520, and the evacuation port 700. That is to say, the second melting step includes forming the boundary wall 42 that closes the air passages 600 by deforming the partition 420 at the second melting temperature Tm2 while evacuating the first space 510 through the air passages 600, the second space 520, and the evacuation port 700. This further reduces the chances of the degree of vacuum decreasing in the vacuum space 50 during the second melting step. Nevertheless, in the first melting step and second melting step, the first space 510 does not have to be evacuated through the air passages 600, the second space 520, and the evacuation port 700.

In the second melting step, the second melting temperature Tm2 is set at a temperature equal to or higher than the second softening point as described above. Since the second softening point is higher than the first softening point of the peripheral wall 410, not only the partition 420 but also the peripheral wall 410 soften through the second melting step. More specifically, the peripheral wall 410 tends to be softened and deformed more easily than the partition 420. By going through the second melting step, the first space 510 has turned into the vacuum space 50. Thus, a pressure difference has been created between the inside and outside of the assembly 100. However, there is the reinforcing wall 430 adjacent to the peripheral wall 410 in the internal space (vacuum space 50) and the reinforcing wall 430 has a third softening point higher than the first softening point (and equal to the second softening point in this embodiment). Thus, at the second melting temperature Tm2, the reinforcing wall 430 is deformed less easily than the peripheral wall 410. That is to say, the reinforcing wall 430 plays the role of reducing the deformation of the peripheral wall 410. This reduces the chances of the peripheral wall 410 being deformed toward the first space 510 due to the pressure difference. Consequently, this reduces the chances of causing insufficient bonding between the pair of glass substrates 200, 300 (such as creation of a gap between the peripheral wall 410 and the pair of glass substrates 200, 300) due to the deformation of the peripheral wall 410. This contributes to increasing the production yield.

By performing these preparatory steps, the work in progress 110 shown in FIG. 3 is obtained. As shown in FIGS. 3 and 11, the work in progress 110 includes the pair of glass substrates (first and second glass substrates) 200, 300, the peripheral wall 410, the boundary wall 42, and the reinforcing wall 430. In addition, the work in progress 110 also has the vacuum space 50 and the second space 520. The work in progress 110 further includes, in the vacuum space 50, the gas adsorbent 60 and the plurality of pillars (spacers) 70. The work in progress 110 further has the evacuation port 700.

The boundary wall 42 (spatially) separates the vacuum space 50 from the second space 520. The boundary wall (second part) 42, a portion surrounding the vacuum space 50 (i.e., the first part) 41 of the peripheral wall 410, and a portion surrounding the vacuum space 50 (i.e., the reinforcing portion) 43 of the reinforcing wall 430 together form a frame member 40 surrounding the vacuum space 50. The frame member 40 not only surrounds the vacuum space 50 entirely but also hermetically bonds the first and second glass substrates 200, 300 together.

The vacuum space 50 is created by evacuating the first space 510 through the second space 520 and the evacuation port 700 as described above. In other words, the vacuum space 50 is the first space 510, of which the degree of vacuum is a predetermined value or less. The predetermined value may be 0.1 Pa, for example. The vacuum space 50 is perfectly closed hermetically by the first glass substrate 200, the second glass substrate 300, and the frame member 40, and therefore, is separated from the second space 520 and the evacuation port 700.

Figure 12:
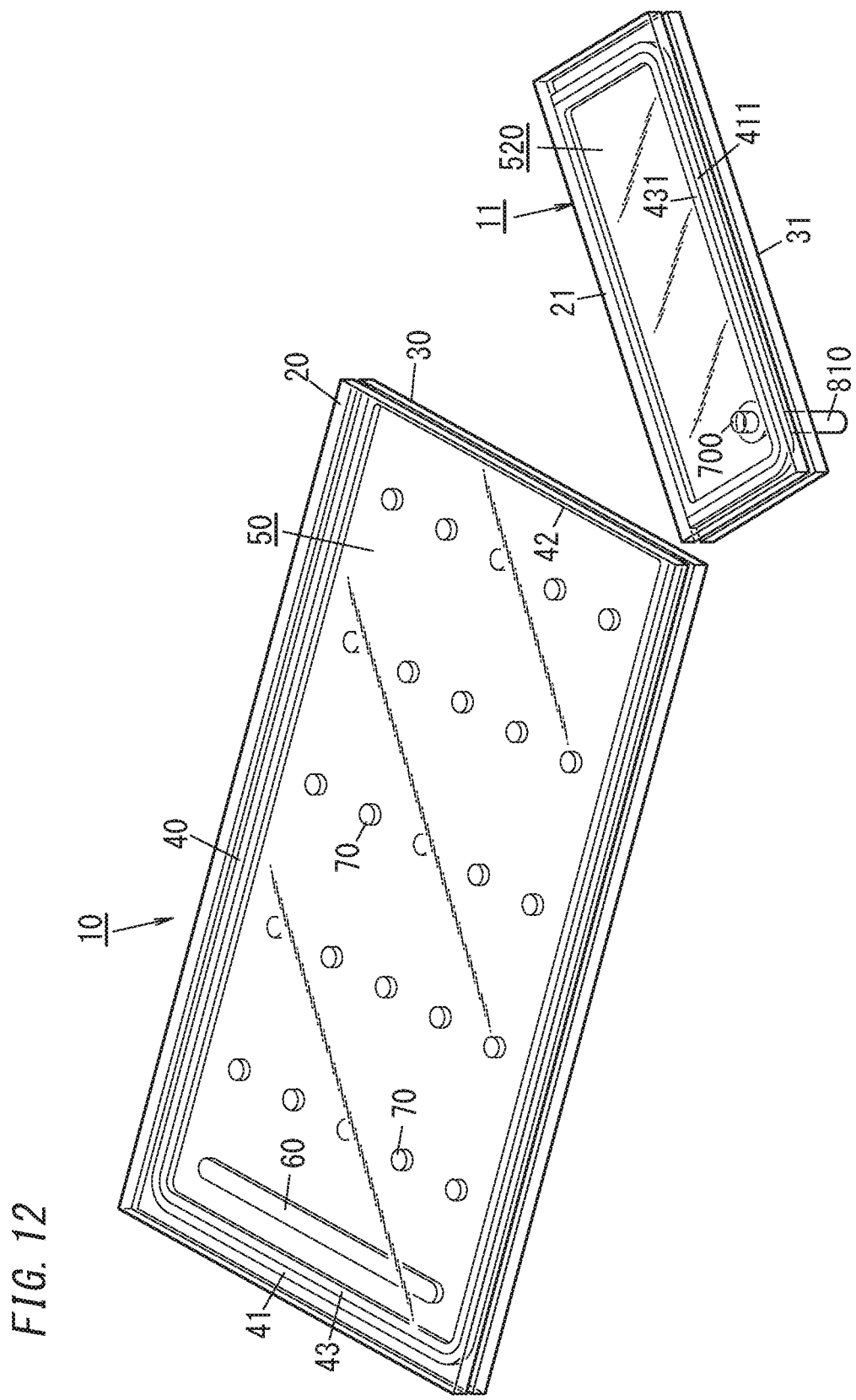
FIG. 12 illustrates yet another step of the method for manufacturing the glass panel unit according to the exemplary embodiment.

The removing step is performed after the preparatory steps have been performed. The removing step is the step of removing a part 11 having the second space 520 from the work in progress 110 to obtain the glass panel unit 10 as a part having the vacuum space 50 as shown in FIG. 12.

The glass panel unit 10 includes the pair of (first and second) glass panels 20, 30, the frame member 40, the gas adsorbent 60, and the plurality of pillars 70 as described above. The first glass panel 20 is a part, corresponding to the first space 510 (vacuum space 50), of the first glass substrate 200. The second glass panel 30 is a part, corresponding to the first space 510 (vacuum space 50), of the second glass substrate 300. The frame member 40 includes the first part 41 and second part 42 that form the body 401 and the reinforcing portion 43. The first part 41 is a portion, surrounding the first space 510 (vacuum space 50), of the peripheral wall 410. The second part 42 is the boundary wall 42 itself. The reinforcing portion 43 is a portion, surrounding the first space 510 (vacuum space 50), of the reinforcing wall 430.

On the other hand, the unnecessary portion 11 includes a part 21, surrounding the second space 520, of the first glass substrate 200 and a part 31, surrounding the second space 520, of the second glass substrate 300. The unnecessary portion 11 further includes a part 411, surrounding the second space 520, of the peripheral wall 410 and a part 431, surrounding the second space 520, of the reinforcing wall 430. Note that the unnecessary portion 11 is suitably as small as possible, considering the manufacturing cost of the glass panel unit 10.

Specifically, in the removing step, the work in progress 110 unloaded from the melting furnace is cut off along the cutting line 900 shown in FIG. 3 to be divided into a predetermined part (glass panel unit) 10 having the vacuum space 50 and a part (unnecessary portion) 11 having the second space 520. Note that the shape of the cutting line 900 is determined by the shape of the glass panel unit 10. Since the glass panel unit 10 has a rectangular shape, the cutting line 900 has a linear shape aligned with the length of the boundary wall 42. In particular, in this embodiment, the cutting line 900 passes over the boundary wall 42. Specifically, the cutting line 900 passes through the middle of the width of the boundary wall 42 and extends along the length of the boundary wall 42. That is to say, in the removing step, the boundary wall 42 is split along the width thereof into two parts, one of which forms part (i.e., the second part) of the body 401 of the glass panel unit 10 and the other of which is removed along with the unnecessary portion 11. Note that the cutting line 900 does not have to pass over the boundary wall 42. For example, if the cutting line 900 passes between the boundary wall 42 and the evacuation port 700, then a glass panel unit 10 with no evacuation ports 700 is obtained. However, drawing the cutting line 900 over the boundary wall 42 allows the pair of glass substrates 200, 300 to be cut off along with the boundary wall 42, thus achieving the advantage of facilitating cutting off the work in progress 110.

The glass panel unit 10 shown in FIGS. 1 and 2 is obtained through the preparatory steps and removing step described above.

2. Variations

Note that the embodiment described above is only an example of the present disclosure and should not be construed as limiting. Rather, the embodiment may be readily modified in various manners depending on a design choice or any other factor without departing from a scope of the present disclosure. Next, variations of the embodiment described above will be enumerated one after another.

Figure 13:
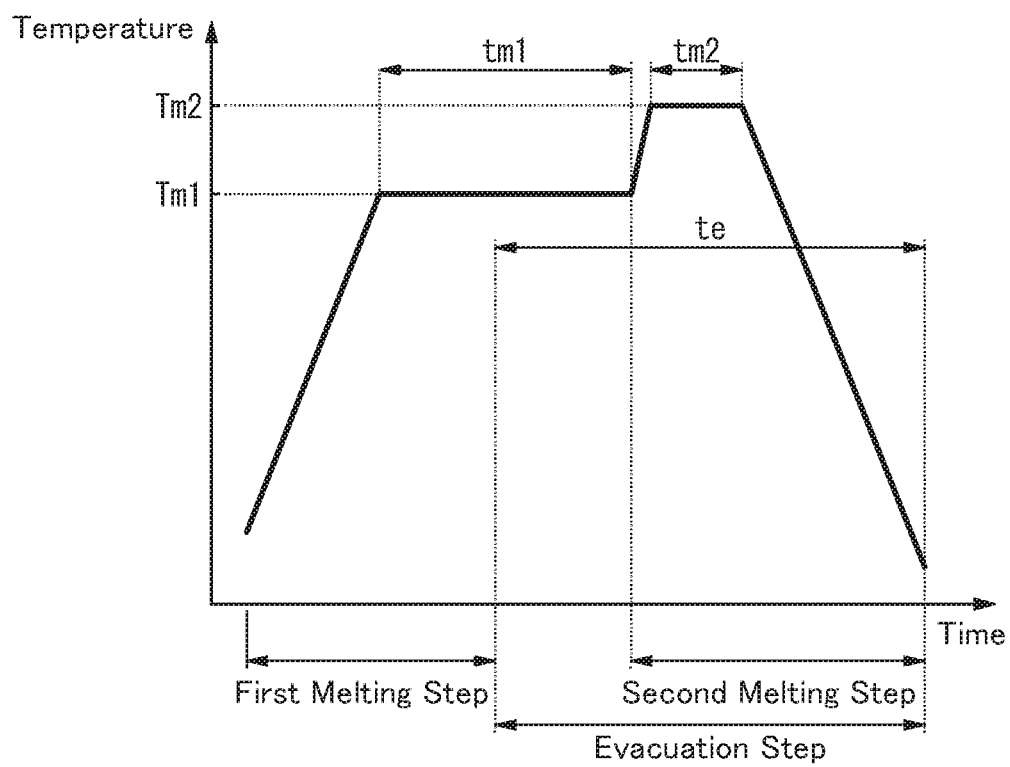
FIG. 13 illustrates a method for manufacturing a glass panel unit according to a variation of the exemplary embodiment.

In the embodiment described above, the temperature of the melting furnace is lowered from the first melting temperature Tm1 to the evacuation temperature Te before the second melting step is started. Alternatively, the temperature of the melting furnace may be maintained at the first melting temperature Tm1 as shown in FIG. 13 until the second melting step is started. This allows the peripheral wall 410 to be further softened compared to the case shown in FIG. 10, thus facilitating, even when the pair of glass substrates 200, 300 has warpage, hermetically bonding the pair of glass substrates 200, 300 together with the peripheral wall 410. In addition, the presence of the reinforcing wall 430 in the first space 510 reduces the chances of the peripheral wall 410 being deformed toward the first space 510 due to the pressure difference. Optionally, the evacuation step may be started after the first melting step and ended before the second melting step. Nevertheless, the advantages described above are achieved by performing the evacuation step in parallel with the first melting step and the second melting step In the embodiment described above, the glass panel unit 10 has a rectangular shape. However, this is only an example and should not be construed as limiting. Alternatively, the glass panel unit 10 may also have a circular, polygonal, or any other desired shape. That is to say, the first glass panel 20, the second glass panel 30, and the body 401 of the frame member 40 do not have to be rectangular but may also have a circular, polygonal, or any other desired shape. In addition, the respective shapes of the first glass substrate 200, the second glass substrate 300, the peripheral wall 410, the partition 420, and the reinforcing wall 430 do not have to be the ones adopted in the embodiment described above, but may also be any other shapes that allow glass panel unit 10 of a desired shape to be obtained. Note that the shape and dimensions of the glass panel unit 10 may be determined according to the intended use of the glass panel unit 10.

The pair of glass panels 20, 30 does not have to have the same planar shape and planar dimensions and does not have to have the same thickness, either. In addition, the pair of glass panels 20, 30 does not have to be made of the same material, either. The same statement applies to the pair of glass substrates 200, 300 as well.

The body 401 of the frame member 40 does not have to have the same planar shape as the pair of glass panels 20, 30. Likewise, the peripheral wall 410 does not have to have the same planar shape as the pair of glass substrates 200, 300, either.

Optionally, the peripheral wall 410 (first part 41) may include not only the first sealing material but also any other element such as a core material. The partition 420 (boundary wall 42) may include not only the second sealing material but also any other element such as a core material. The reinforcing wall 430 (reinforcing portion 43) may include not only the third sealing material but also any other element such as a core material.

Furthermore, in the frame member 40 according to the embodiment described above, both ends of the boundary wall 42 are coupled to the first part 41 with the reinforcing portion 43 interposed between them. However, this is only an example and should not be construed as limiting. Alternatively, the boundary wall 42 may be coupled to the first part 41 with no reinforcing portion 43 interposed between them. In addition, the reinforcing portion 43 does not have to cover the entire surface, facing the space (vacuum space 50), of the first part 41 in a plan view. Furthermore, the reinforcing portion 43 may be lower in height than the first part 41. That is to say, the reinforcing portion 43 does not have to cover the entire surface, facing the space (vacuum space 50), of the first part 41. Optionally, the reinforcing portion 43 may be made up of a plurality of parts arranged at intervals along the first part 41. Nevertheless, the reinforcing portion 43 is suitably adjacent to the entire surface, facing the space (vacuum space 50), of the first part 41.

Also, in the assembly 100, the peripheral wall 410 is just provided between the pair of glass substrates 200, 300 and does not bond the pair of glass substrates 200, 300 together. Optionally, however, in the assembly 100 stage, the peripheral wall 410 may bond the pair of glass substrates 200, 300 together. In short, in the assembly 100, the peripheral wall 410 needs to be provided between the pair of glass substrates 200, 300 and does not have to bond the pair of glass substrates 200, 300 together.

Furthermore, in the embodiment described above, the partition 420 is out of contact with the peripheral wall 410 or the reinforcing wall 430. This allows air passages 610, 620 to be formed in the respective gaps between both ends of the partition 420 and the reinforcing wall 430. However, this is only an example and should not be construed as limiting. Alternatively, only one of the two ends of the partition 420 may be coupled to the reinforcing wall 430 or the peripheral wall 410. In that case, a single air passage 600 may be formed between the partition 420 and either the reinforcing wall 430 or the peripheral wall 410. Still alternatively, the partition 420 may even have both ends thereof coupled to the reinforcing wall 430 or the peripheral wall 410. In that case, the air passage 600 may be a through hole cut through the partition 420. Alternatively, the air passage 600 may be the gap between the partition 420 and the first glass substrate 200. Still alternatively, the partition 420 may be made up of two or more partitions arranged at intervals. In that case, the air passage 600 may be the gap between the two or more partitions.

Furthermore, in the embodiment described above, the internal space 500 is partitioned into the single first space 510 and the single second space 520. However, this is only an example and should not be construed as limiting. Alternatively, the internal space 500 may also be partitioned by the partition 420 into one or more first spaces 510 and one or more second spaces 520. When the internal space 500 has two or more first spaces 510, two or more glass panel units 10 may be obtained from a single work in progress 110.

Furthermore, in the embodiment described above, the third sealing material is the same as the second sealing material and the third softening point is equal to the second softening point. However, the third sealing material may be a different material from the second sealing material. For example, the third sealing material may have a third softening point which is different from the second softening point of the second sealing material.

In the embodiment described above, a melting furnace is used to heat the peripheral wall 410, the gas adsorbent 60, the partition 420, and the reinforcing wall 430. However, heating may be conducted by any appropriate heating means. The heating means may be a laser beam or a heat exchanger plate connected to a heat source, for example.

In the embodiment described above, the air passages 600 include the two air passages 610, 620. Alternatively, only one air passage 600 may be provided or the air passages 600 may include three or more air passages. Furthermore, the air passages 600 may have any shape without limitation.

In the embodiment described above, the evacuation port 700 is cut through the second glass substrate 300. However, this is only an example and should not be construed as limiting. Alternatively, the evacuation port 700 may be cut through the first glass substrate 200 or may also be cut through the part 411 of the peripheral wall 410. In short, the evacuation port 700 just needs to be provided for the unnecessary portion 11.

In the embodiment described above, the getter of the gas adsorbent 60 is an evaporative getter. Alternatively, the getter may also be a non-evaporative getter.

In the embodiment described above, the gas adsorbent 60 has an elongate flat plate shape. However, the gas adsorbent 60 may also have any other shape. In addition, the gas adsorbent 60 does not have to be located at an end of the vacuum space 50. Furthermore, in the embodiment described above, the gas adsorbent 60 is formed by applying a liquid including a powder of a getter (such as a dispersion liquid obtained by dispersing the powder of the getter in a liquid or a solution obtained by dissolving the powder of the getter in a liquid). However, this is only an example and should not be construed as limiting. Alternatively, the gas adsorbent 60 may include a substrate and a getter adhered to the substrate. Such a gas adsorbent 60 may be obtained by immersing the substrate in a liquid including a powder of the getter and drying the substrate. Note that the substrate may have any desired shape and may have an elongate rectangular shape, for example. Still alternatively, the gas adsorbent 60 may also be a film formed to cover the surface of the second glass substrate 300 either entirely or only partially. Such a gas adsorbent 60 may be obtained by coating the surface of the second glass substrate 300 with a liquid including a powder of the getter. Yet alternatively, the gas adsorbent 60 may be included in the pillars 70. The pillars 70 including the gas adsorbent 60 may be obtained by making the pillars 70 of a material containing the getter. Alternatively, the gas adsorbent 60 may even be a solid matter made of the getter. In the embodiment described above, the glass panel unit 10 includes a plurality of pillars 70. Alternatively, the glass panel unit 10 may include only one pillar 70. Still alternatively, the glass panel unit 10 may have no pillars 70 at all.

In the embodiment described above, the first space 510 is the vacuum space 50. However, the vacuum space 50 may be replaced with a pressure-reduced space. The pressure-reduced space is the first space 510 in a pressure-reduced condition. As used herein, the "pressure reduced condition" refers to a condition in which the pressure is lower than the atmospheric pressure.

3. Aspects

As can be seen from the foregoing description of the exemplary embodiment and its variations, the present disclosure has the following aspects. In the following description, reference signs are added in parentheses to the respective constituent elements solely for the purpose of clarifying the correspondence between those aspects of the present disclosure and the exemplary embodiment described above.

A glass panel unit (10) according to a first aspect includes: a pair of glass panels (20, 30) arranged to face each other; and a frame member (40) disposed between the pair of glass panels (20, 30) to hermetically bond the pair of glass panels (20, 30) together. The frame member (40) includes: a body (401); and a reinforcing portion (43). The body (401) has a frame shape and includes: a first part (41) containing a first sealing material having a first softening point; and a second part (42) containing a second sealing material having a second softening point that is higher than the first softening point. The reinforcing portion (43) contains a third sealing material having a third softening point that is higher than the first softening point. The reinforcing portion (43) is adjacent to the first part (41) in a space (510, 51) surrounded with the pair of glass panels (20, 30) and the body (401). The first aspect contributes to increasing the production yield.

A glass panel unit (10) according to a second aspect may be implemented in combination with the first aspect. In the second aspect, the second softening point and the third softening point are equal to each other. The second aspect contributes to increasing the production yield.

A glass panel unit (10) according to a third aspect may be implemented in combination with the first or second aspect. In the third aspect, the second sealing material and the third sealing material are the same material. The third aspect contributes to cost reduction.

A glass panel unit (10) according to a fourth aspect may be implemented in combination with any one of the first to third aspects. In the fourth aspect, the reinforcing portion (43) covers an entire surface, facing the space (510, 51), of the first part (41) in a plan view. The fourth aspect contributes to further increasing the production yield.

A work in progress (110) of a glass panel unit according to a fifth aspect includes: a pair of glass substrates (200, 300) arranged to face each other; a peripheral wall (410); a boundary wall (42); and a reinforcing wall (430). The peripheral wall (410) has a frame shape, contains a first sealing material having a first softening point and is disposed between the pair of glass substrates (200, 300). The boundary wall (42) contains a second sealing material having a second softening point that is higher than the first softening point. The boundary wall (42) hermetically separates an internal space (500), surrounded with the pair of glass substrates (200, 300) and the peripheral wall (410), into a first space (510, 50) and a second space (520). The reinforcing wall (430) contains a third sealing material having a third softening point that is higher than the first softening point. The reinforcing wall (430) is adjacent to the peripheral wall (410) in the internal space (500). The fifth aspect contributes to increasing the production yield.

A work in progress (110) of a glass panel unit according to a sixth aspect may be implemented in combination with the fifth aspect. In the sixth aspect, the second softening point and the third softening point are equal to each other. The sixth aspect contributes to increasing the production yield.

A work in progress (110) of a glass panel unit according to a seventh aspect may be implemented in combination with the fifth or sixth aspect. In the seventh aspect, the second sealing material and the third sealing material are the same material. The seventh aspect contributes to cost reduction.

A glass panel unit assembly (100) according to an eighth aspect includes: a pair of glass substrates (200, 300) arranged to face each other; a peripheral wall (410); a partition (420); a reinforcing wall (430); an air passage (600); and an evacuation port (700). The peripheral wall (410) has a frame shape, contains a first sealing material having a first softening point and is disposed between the pair of glass substrates (200, 300). The partition (420) contains a second sealing material having a second softening point that is higher than the first softening point. The partition (420) partitions an internal space (500), surrounded with the pair of glass substrates (200, 300) and the peripheral wall (410), into a first space (510, 50) and a second space (520). The reinforcing wall (430) contains a third sealing material having a third softening point that is higher than the first softening point. The reinforcing wall (430) is adjacent to the peripheral wall (410) in the internal space (500). The air passage (600) connects the first space (510, 50) and the second space (520) together. The evacuation port (700) connects the second space (520) to an external environment. The eighth aspect contributes to increasing the production yield.

A glass panel unit assembly (100) according to a ninth aspect may be implemented in combination with the eighth aspect. In the ninth aspect, the second softening point and the third softening point are equal to each other. The ninth aspect contributes to increasing the production yield.

A glass panel unit assembly (100) according to a tenth aspect may be implemented in combination with the eighth or ninth aspect. In the tenth aspect, the second sealing material and the third sealing material are the same material. The tenth aspect contributes to cost reduction.

A method for manufacturing a glass panel unit according to an eleventh aspect includes an assembling step, an evacuation step, and a sealing step. The assembling step includes providing the glass panel unit assembly (100) according to any one of the eighth to tenth aspects. The evacuation step includes evacuating the first space (510, 50) through the air passage (600), the second space (520), and the evacuation port. The sealing step includes heating the partition (420) to a temperature equal to or higher than the second softening point to deform the partition (420) and thereby close the air passage (600). The eleventh aspect contributes to increasing the production yield.

A method for manufacturing a glass panel unit according to a twelfth aspect may be implemented in combination with the eleventh aspect. In the twelfth aspect, the method includes a bonding step to be performed between the assembling step and the evacuation step. The bonding step includes heating and once melting the peripheral wall (410) at a melting temperature (Tm1) to hermetically bond the pair of glass substrates (200, 300) together with the peripheral wall (410). The twelfth aspect contributes to increasing the production yield.

A method for manufacturing a glass panel unit according to a thirteenth aspect may be implemented in combination with the twelfth aspect. In the thirteenth aspect, the melting temperature (Tm1) is set at a temperature equal to or higher than the first softening point and lower than the second softening point and the third softening point. The thirteenth aspect reduces the chances of the partition (420) being deformed to close the air passage (600).

A method for manufacturing a glass panel unit according to a fourteenth aspect may be implemented in combination with the thirteenth aspect. In the fourteenth aspect, the melting temperature (Tm1) is closer to the second softening point or the third softening point than to the first softening point. The fourteenth aspect allows the peripheral wall (410) to be further softened while reducing deformation of the partition (420) and the reinforcing wall (430).

REFERENCE SIGNS LIST

10 Glass Panel Unit
100 Assembly
110 Work in Progress
20, 30 Glass Panel
200, 300 Glass Substrate 40 Frame Member
401 Body
41 First Part
42 Boundary Wall (Second Part)
43 Reinforcing Portion
410 Peripheral Wall
420 Partition
430 Reinforcing Wall
50 Vacuum Space
500 Internal Space
510 First Space
520 Second Space
600 Air Passage
700 Evacuation Port

The invention claimed is:

1. A method for manufacturing a glass panel unit, the method comprising an assembling step, an evacuation step, and a sealing step, the assembling step including providing a glass panel unit assembly, the glass panel unit assembly comprising:

a pair of glass substrates arranged to face each other;

a peripheral wall having a frame shape, containing a first sealing material having a first softening point and disposed between the pair of glass substrates;

a partition containing a second sealing material having a second softening point that is higher than the first softening point and partitioning an internal space, surrounded with the pair of glass substrates and the peripheral wall, into a first space and a second space;

a reinforcing wall containing a third sealing material having a third softening point that is higher than the first softening point, the reinforcing wall being adjacent to the peripheral wall in the internal space;

an air passage connecting the first space and the second space together; and an evacuation port connecting the second space to an external environment, the reinforcing wall covering an entire surface, facing the internal space, of the peripheral wall in a plan view, the evacuation step including evacuating the first space through the air passage, the second space, and the evacuation port, the sealing step including heating the partition to a temperature equal to or higher than the second softening point to deform the partition and thereby close the air passage, the method further comprising a bonding step to be performed before the sealing step, the bonding step including heating and once melting the peripheral wall at a melting temperature to hermetically bond the pair of glass substrates together with the peripheral wall, the melting temperature being set at a temperature equal to or higher than the first softening point and lower than the second softening point and the third softening point, the method further comprising a removing step to be performed after the sealing step, the removing step being the step of removing a part having the second space from a part having the first space to obtain the part having the first space as the glass panel unit, after the removing step, in the glass panel unit, the reinforcing portion covering an entire surface, facing the first space, of the peripheral wall in a plan view, and the reinforcing portion not covering a surface, facing the first space, of the partition in a plan view.

2. The method of claim 1, wherein the melting temperature is closer to the second softening point or the third softening point than to the first softening point.

* * * * *